(12) United States Patent
Scangamor et al.

(10) Patent No.: US 12,257,735 B2
(45) Date of Patent: Mar. 25, 2025

(54) ROUTER INCLUDING CUTTING DEPTH LOCKING AND ADJUSTMENT MECHANISM

(71) Applicant: TECHTRONIC CORDLESS GP, Anderson, SC (US)

(72) Inventors: Andrew J. Scangamor, Anderson, SC (US); Patrick Murphy, Anderson, SC (US); Austin J. Johnson, Greenville, SC (US); Divyeshwar Ramesh, Simpsonville, SC (US); Antoinette Louw, Kowloon (HK); Mason A. Matlock, Mauldin, SC (US); Wen Nie, Dongguan (CN); Ping Li, Dongguan (CN)

(73) Assignee: Techtronic Cordless GP, Anderson, SC (US)

( * ) Notice: Subject to any disclaimer, the term of this patent is extended or adjusted under 35 U.S.C. 154(b) by 287 days.

(21) Appl. No.: 18/064,654

(22) Filed: Dec. 12, 2022

(65) Prior Publication Data
US 2023/0191647 A1    Jun. 22, 2023

(30) Foreign Application Priority Data
Dec. 20, 2021    (CN) .......................... 202123207450.2

(51) Int. Cl.
*B27C 5/10*    (2006.01)
*B23Q 16/02*    (2006.01)

(52) U.S. Cl.
CPC .............. *B27C 5/10* (2013.01); *B23Q 16/024* (2013.01)

(58) Field of Classification Search
CPC ....................................................... B27C 5/10
See application file for complete search history.

(56) References Cited

U.S. PATENT DOCUMENTS

| | | |
|---|---|---|
| 1,581,719 A | 4/1926 | Carter |
| 1,805,164 A | 5/1931 | Carter |
| (Continued) | | |

FOREIGN PATENT DOCUMENTS

| | | |
|---|---|---|
| CN | 1235720 C | 1/2006 |
| CN | 2858198 Y | 1/2007 |
| (Continued) | | |

OTHER PUBLICATIONS

The Tool Nut, [Review] Milwaukee M18 Fuel Brushless Compact Router 2723-20, Feb. 4, 2020, https://youtu.be/gNbLyG5bOCE?t=205, 3:25-3:58 (Year: 2020).*

(Continued)

*Primary Examiner* — Matthew Katcoff
(74) *Attorney, Agent, or Firm* — Michael Best & Friedrich LLP

(57) ABSTRACT

A router includes a motor unit and a base that receives the motor unit. A threaded shaft is supported on either the motor unit or the base. A slide is supported on the other of the motor unit and the base. The slide engages with the shaft in a first position of the slide in which micro-adjustments to a cutting depth are permitted. The slide disengages with the shaft in a second position of the slide in which macro-adjustments to the cutting depth are permitted. With a lever in a locked position, neither macro-adjustments nor micro-adjustments are permitted regardless of the slide being in the first position or the second position. With the lever in a micro-adjustment position, only micro-adjustments are permitted with the slide in the first position. With the lever in an unlocked position, the lever disengages the slide from the shaft to permit macro-adjustments.

20 Claims, 5 Drawing Sheets

(56) References Cited

U.S. PATENT DOCUMENTS

| | | | |
|---|---|---|---|
| 2,695,522 A | 11/1954 | Papworth | |
| 2,842,173 A | 7/1958 | Turner et al. | |
| 2,897,302 A | 7/1959 | Godfrey et al. | |
| 3,033,252 A | 5/1962 | Atkinson | |
| 3,206,989 A | 9/1965 | Enders | |
| 3,407,431 A | 10/1968 | Melnik | |
| 3,511,947 A | 5/1970 | Eikermann et al. | |
| 5,191,968 A | 3/1993 | McCurry | |
| 5,346,342 A | 9/1994 | Winchester | |
| 5,590,988 A | 1/1997 | Rusconi | |
| 5,988,241 A | 11/1999 | Bosten et al. | |
| 5,998,897 A | 12/1999 | Bosten et al. | |
| 6,079,915 A | 6/2000 | Bosten et al. | |
| 6,139,229 A | 10/2000 | Bosten et al. | |
| 6,261,036 B1 | 7/2001 | Bosten et al. | |
| 6,350,087 B1 | 2/2002 | Berry et al. | |
| 6,443,675 B1 | 9/2002 | Kopras et al. | |
| 6,488,455 B1 | 12/2002 | Staebler et al. | |
| 6,558,090 B2 | 5/2003 | Lagaly et al. | |
| 6,558,091 B2 | 5/2003 | Smith et al. | |
| 6,568,887 B2 | 5/2003 | Hathcock et al. | |
| D479,968 S | 9/2003 | McDonald et al. | |
| 6,619,894 B2 | 9/2003 | Hathcock et al. | |
| 6,648,567 B2 | 11/2003 | Berry et al. | |
| 6,725,892 B2 | 4/2004 | McDonald et al. | |
| 6,890,135 B2 | 5/2005 | Kopras et al. | |
| 6,951,232 B2 | 10/2005 | McDonald et al. | |
| 6,991,008 B2 | 1/2006 | McDonald et al. | |
| 7,073,993 B2 | 7/2006 | Cooper et al. | |
| 7,089,979 B2 | 8/2006 | Cooper et al. | |
| 7,094,011 B2 | 8/2006 | Kopras et al. | |
| 7,108,464 B2 | 9/2006 | Cooper et al. | |
| 7,121,775 B2 | 10/2006 | Onose et al. | |
| 7,207,362 B2 | 4/2007 | McDonald et al. | |
| 7,264,429 B2 | 9/2007 | Miller | |
| 7,275,900 B1 | 10/2007 | Phillips et al. | |
| 7,290,575 B2 | 11/2007 | Freese et al. | |
| 7,303,364 B2 | 12/2007 | Cooper et al. | |
| 7,316,528 B2 | 1/2008 | Cooper et al. | |
| 7,334,613 B2 | 2/2008 | Griffin et al. | |
| 7,334,614 B2 | 2/2008 | Cooper et al. | |
| 7,370,679 B2 | 5/2008 | McDonald et al. | |
| 7,402,008 B2 | 7/2008 | Phillips et al. | |
| 7,423,511 B2 | 9/2008 | Nakasone et al. | |
| 7,451,791 B2 | 11/2008 | Cooper et al. | |
| 7,455,488 B2 | 11/2008 | Carlson et al. | |
| 7,473,058 B2 | 1/2009 | Zhu | |
| 7,506,447 B2 | 3/2009 | Wheeler et al. | |
| 7,523,772 B2 | 4/2009 | McDonald et al. | |
| 7,524,151 B2 | 4/2009 | Zhu | |
| 7,552,749 B2 | 6/2009 | Kageler et al. | |
| 7,556,070 B2 | 7/2009 | McDonald et al. | |
| 7,578,325 B2 | 8/2009 | Freese et al. | |
| 7,654,294 B2 | 2/2010 | Cooper et al. | |
| 7,669,620 B2 | 3/2010 | McDonald et al. | |
| 7,677,280 B2 | 3/2010 | McDonald et al. | |
| 7,686,046 B2 | 3/2010 | Griffin et al. | |
| 7,900,662 B2 | 3/2011 | Wall et al. | |
| 7,931,054 B2 | 4/2011 | Pozgay et al. | |
| 7,946,318 B2 | 5/2011 | Carroll | |
| 7,950,882 B2 | 5/2011 | Zaiser et al. | |
| 7,975,737 B2 | 7/2011 | Griffin et al. | |
| 7,980,325 B2 | 7/2011 | Botefuhr et al. | |
| 8,047,242 B2 | 11/2011 | Wall et al. | |
| 8,087,437 B2 | 1/2012 | Goddard et al. | |
| 8,136,558 B2 | 3/2012 | Pozga et al. | |
| 8,607,833 B2 | 12/2013 | Pozgay et al. | |
| 8,747,036 B2 | 6/2014 | Kato et al. | |
| 8,816,544 B2 | 8/2014 | Tanimoto et al. | |
| 8,922,141 B2 | 12/2014 | Nakamura et al. | |
| 8,935,857 B2 | 1/2015 | Inayoshi | |
| 9,022,705 B2 | 5/2015 | Shibata et al. | |
| 9,073,228 B2 | 7/2015 | Inayoshi et al. | |
| 9,144,919 B2 | 9/2015 | Cui et al. | |
| 9,302,406 B2 | 4/2016 | Kato et al. | |
| 9,333,669 B2 | 5/2016 | Okouchi et al. | |
| 9,346,144 B2 | 5/2016 | Tan | |
| 9,669,534 B2 | 6/2017 | Okouchi et al. | |
| 9,724,815 B2 | 8/2017 | Zhen et al. | |
| 9,855,649 B2 | 1/2018 | Schnell et al. | |
| 10,195,760 B2 | 2/2019 | Firth et al. | |
| 10,207,399 B2 | 2/2019 | Okouchi et al. | |
| 10,647,019 B2 | 5/2020 | Truesdale et al. | |
| 11,648,704 B2* | 5/2023 | Mondich | B27C 5/10 144/136.95 |
| 2002/0197123 A1 | 12/2002 | Kopras et al. | |
| 2003/0121389 A1 | 7/2003 | Wheeler et al. | |
| 2005/0225183 A1 | 10/2005 | Braun et al. | |
| 2006/0102249 A1 | 5/2006 | Cooper et al. | |
| 2006/0191597 A1 | 8/2006 | Cooper et al. | |
| 2007/0284890 A1 | 12/2007 | Guido | |
| 2008/0014844 A1 | 1/2008 | Pontieri | |
| 2008/0283147 A1 | 11/2008 | Cooper et al. | |
| 2009/0114312 A1 | 5/2009 | Cooper et al. | |
| 2010/0126627 A1 | 5/2010 | Goddard et al. | |
| 2012/0241047 A1 | 9/2012 | Kato et al. | |
| 2012/0241049 A1 | 9/2012 | Kato et al. | |
| 2016/0318204 A1 | 11/2016 | Truesdale et al. | |
| 2020/0368831 A1 | 11/2020 | Kani et al. | |

FOREIGN PATENT DOCUMENTS

| | | |
|---|---|---|
| CN | 103878419 A | 6/2014 |
| DE | 202010006816 U1 | 10/2010 |
| DE | 202010006817 U1 | 10/2010 |
| DE | 202010006818 U1 | 11/2010 |
| DE | 202011004152 U1 | 6/2011 |
| DE | 102017217504 A1 | 4/2019 |
| DE | 102019003735 A1 | 12/2020 |
| EP | 1166973 B1 | 11/2007 |
| WO | 2016089834 A1 | 6/2016 |
| WO | 2018061556 A1 | 4/2018 |

OTHER PUBLICATIONS

A Concord Carpenter / ToolBoxBuzz, Makita 18V Cordless Compact Router XTR01Z, Sep. 3, 2017, https://youtu.be/c-fgl9x6Auo, 3:28-3:37, 4:06-4:30 (Year: 2017).*

* cited by examiner

ROUTER INCLUDING CUTTING DEPTH LOCKING AND ADJUSTMENT MECHANISM

FIELD OF THE DISCLOSURE

The present disclosure relates generally to the field of power tools, and more particularly to the field of routers.

BACKGROUND OF THE DISCLOSURE

Routers are used to cut material, often wood, to make rounded edges, trace patterns, and make other designs in the material. The cutting depth of the router must be adjusted by a user to adjust the depth of cut into the material.

SUMMARY OF THE DISCLOSURE

The present disclosure provides, in one aspect, a router comprising a motor unit and a base that receives the motor unit. A threaded shaft is supported on either the motor unit or the base. A slide is supported on the other of the motor unit and the base. The slide engages with the shaft in a first position of the slide in which micro-adjustments to a cutting depth are permitted. The slide disengages with the shaft in a second position of the slide in which macro-adjustments to the cutting depth are permitted. A lever is movable between a locked position, a micro-adjustment position, and an unlocked position. In the locked position, neither macro-adjustments nor micro-adjustments are permitted regardless of the slide being in the first position or the second position. In the micro-adjustment position, only micro-adjustments are permitted with the slide in the first position. In the unlocked position, the lever disengages the slide from the shaft to permit macro-adjustments.

The present disclosure provides, in another aspect, a router comprising a motor unit and a base that receives the motor unit. A threaded shaft is rotatably supported on the motor unit. A slide is supported on the base. The slide engages with the shaft in a first position of the slide in which micro-adjustments to a cutting depth are permitted in response to rotation of the shaft relative to the base. The slide disengages with the shaft in a second position of the slide in which macro-adjustments to the cutting depth are permitted in response to an external force from a user to translate the motor unit relative to the base. A lever is movable between a locked position, a micro-adjustment position, and an unlocked position. In the locked position, neither macro-adjustments nor micro-adjustments are permitted regardless of the slide being in the first position or the second position. In the micro-adjustment position, only micro-adjustments are permitted with the slide in the first position. In the unlocked position, the lever disengages the slide from the shaft to permit macro-adjustments.

The present disclosure provides, in another aspect, a method of adjusting a cutting depth of a router. The router includes a motor unit and a base that receives the motor unit. The method includes biasing a slide on one of the base or the motor unit to a first position. In the first position, the slide engages a threaded shaft on the other of the base and the motor unit, thereby preventing macro-adjustments of the cutting depth. The method further includes moving a lever from a locked position to a micro-adjustment position. When the lever is in the locked position, neither macro-adjustments nor micro-adjustments to the cutting depth are permitted regardless of the slide being in the first position or a second position in which the slide is disengaged from the shaft. When the lever is in the micro-adjustment position, only micro-adjustments to the cutting depth are permitted with the slide in the first position. The method further includes moving the lever from the micro-adjustment position to an unlocked position. The method further includes, in response to the lever moving into the unlocked position, moving the slide from the first position to the second position, thereby disengaging the slide from the shaft to permit macro-adjustments of the cutting depth.

Other features and aspects of the disclosure will become apparent by consideration of the following detailed description and accompanying drawings.

Before any embodiments of the disclosure are explained in detail, it is to be understood that the disclosure is not limited to the details of construction and the arrangement of components set forth in the following description or illustrated in the following drawings. Also, it is to be understood that the phraseology and terminology used herein is for the purpose of description and should not be regarded as limiting.

DETAILED DESCRIPTION

Figure 1:
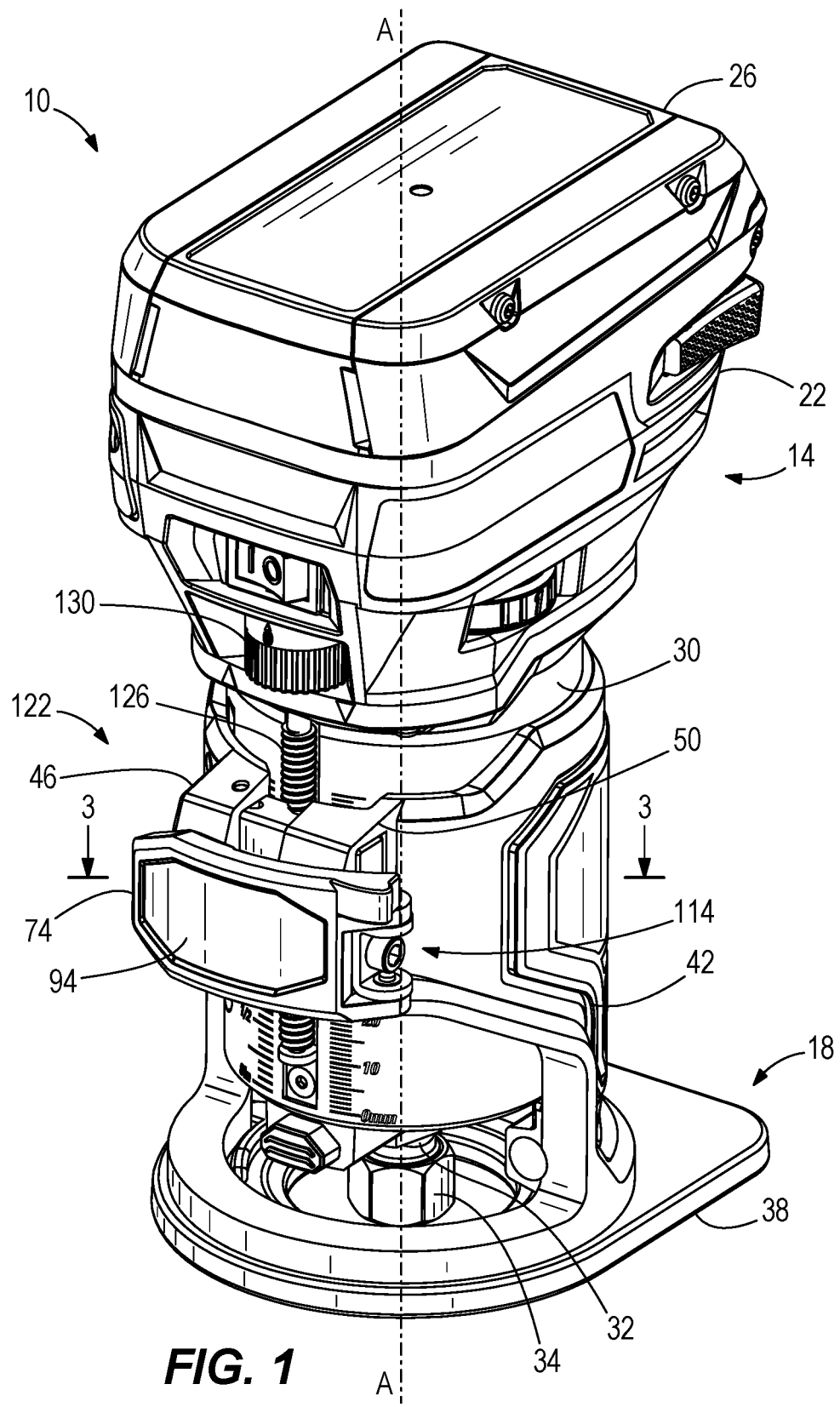
FIG. 1 is a front perspective view of a router in accordance with an embodiment of the present disclosure.

FIG. 1 illustrates a router 10 including a motor unit 14 and a base 18. The motor unit 14 includes a battery receptacle 22 at an upper end thereof, which receives a removable battery pack 26, and a motor housing 30 in which an electric motor is received. The motor unit 14 also includes an output shaft 32 having a tool holder 34 (e.g., a collet and collet nut) to secure a cutting tool (e.g., a drilling or milling bit) to the output shaft 32. In the illustrated embodiment of the router 10, the motor and the output shaft 32 are coaxial and collectively define a longitudinal axis A of the motor unit 14.

The base 18 is selectively secured to the motor unit 14, and more specifically to the motor housing 30, at different positions along the longitudinal axis A to set a cutting depth of the cutting tool. The base 18 includes a shoe 38, the bottom surface of which may contact and slide along a workpiece during a cutting operation, and a tubular mounting portion 42 that extends away from the shoe 38 and substantially surrounds the motor housing 30 of the motor unit 14.

Figure 2:
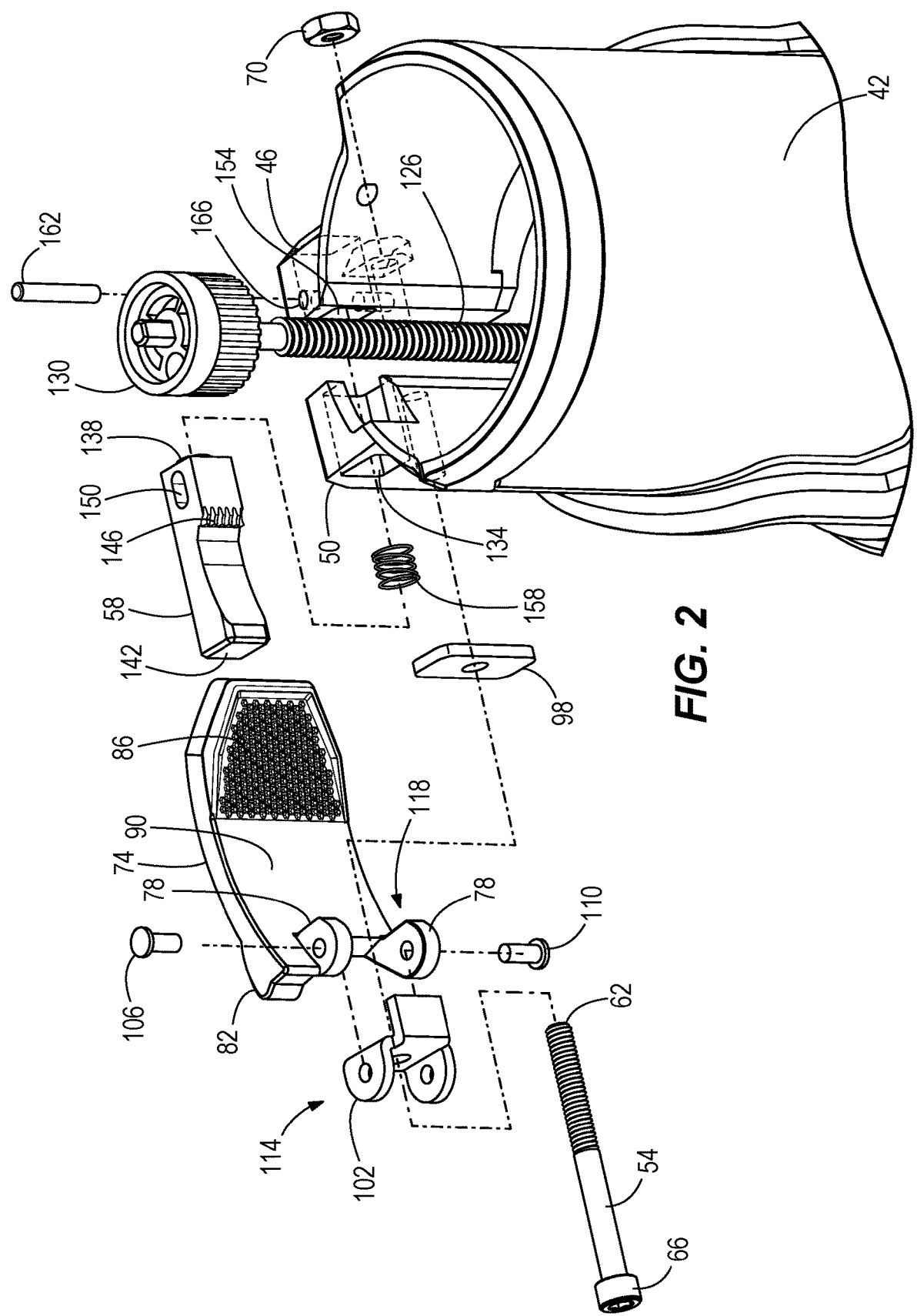
FIG. 2 is a partial exploded view of a portion of the router of FIG. 1, illustrating a depth locking and adjustment mechanism.

With reference to FIGS. 1 and 2, the mounting portion 42 includes two mounting ears 46, 50 that support opposite ends, respectively, of a pin 54 and a slide 58 that extend between the two mounting ears 46, 50. The pin 54 includes a first end 62 and a second end 66, and has a fixed length. The first end 62 of the pin 54 is coupled to the first mounting ear 46 and the second end 66 of the pin 54 is coupled to or positioned against the second mounting ear 50. A nut 70 may be used to fasten the pin 54 to the mounting ears 46, 50. The base also includes a lever 74 that is pivotably coupled to the second end 66 of the pin 54. The lever 74 has a generally curved shape and includes one or more cam lobes 78, a protrusion 82, and a gripping portion 86. The lever 74 includes an inner side 90 and an outer side 94. In the illustrated embodiment of the router 10, the lever 74 is coupled to the second end 66 of the pin 54 by a plate 98, a bracket 102, an upper pin 106, and a lower pin 110. The plate 98 is positioned between the second mounting ear 50 and the bracket 102. Both the upper pin 106 and the lower pin 110 pass through the lever 74 and are received within the bracket 102, thereby defining a hinge 114 that allows the lever 74 to pivot about the upper pin 106 and the lower pin 110. The lever 74 and pin 54 collectively define a cutting depth locking mechanism 118 operable to apply a clamping force between the mounting ears 46, 50 and therefore, the motor housing 30, to lock the motor unit 14 to the base 18 at a desired cutting depth.

With continued reference to FIGS. 1 and 2, the router 10 also includes a cutting depth adjustment mechanism 122, which includes a rotatable, threaded shaft 126 disposed on the motor unit 14. The shaft 126 can have threads of essentially any pitch, depth, and angle. The shaft 126 is parallel to the longitudinal axis A. A micro-adjustment dial 130 is provided on one end of the shaft 126, and rotation of the micro-adjustment dial 130 also rotates the shaft 126. The cutting depth adjustment mechanism 122 also includes the slide 58, which is movable between a first position engaged with the shaft 126 (FIGS. 3 and 4) and a second position disengaged from the shaft 126 (FIG. 5). In a first position, the slide 58 protrudes through a hole 134 in the second mounting ear 50. As the slide 58 moves from the first position to the second position, the slide 58 moves longitudinally in the direction of the first mounting ear 46.

Figure 3:
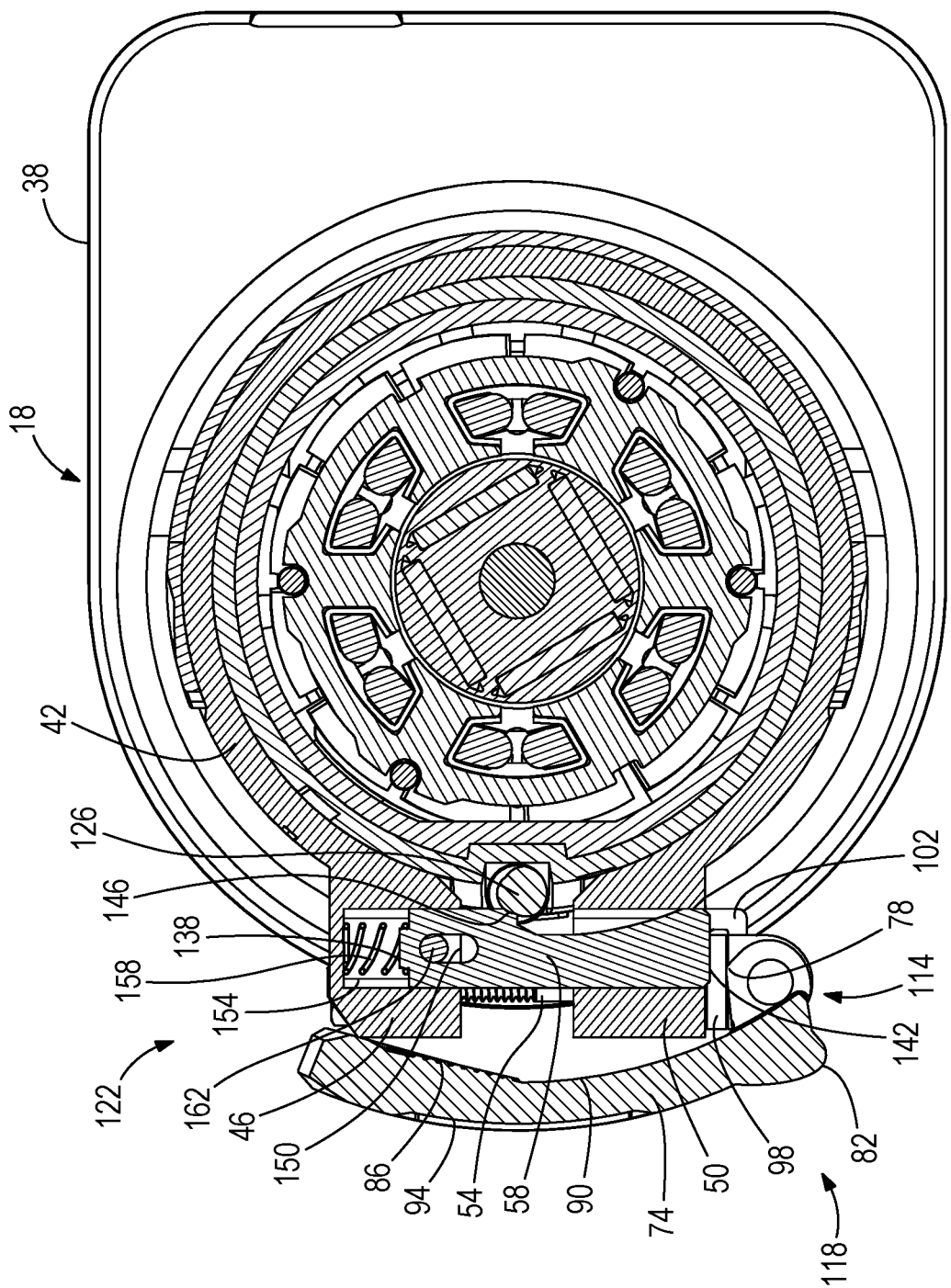
FIG. 3 is a cross-sectional view of the router of FIG. 1 through section line 3-3 in FIG. 1, illustrating a lever of the depth locking and adjustment mechanism in a locked position.

As shown in FIGS. 2 and 3, the slide 58 includes a spring contact end 138, a lever contact end 142 distal from the spring contact end 138, a thread segment 146, and a support hole 150. The spring contact end 138 is positioned within a spring recess 154 in the first mounting ear 46. A spring 158 is positioned within the spring recess 154 and applies a force to the first mounting ear 46 and a substantially equal and opposite force to the spring contact end 138 of the slide 58. The spring 158 is configured to bias the slide 58 toward the first position.

With continuing reference to FIGS. 2 and 3, the support hole 150 in the slide 58 receives a retaining pin 162 to prevent the slide 58 from moving beyond the first position and overextending the spring 158. In some embodiments, the retaining pin 162 also prevents the slide 58 from moving beyond the second position and over-compressing the spring 158. In other words, the retaining pin 162 prevents the slide 58 from moving too far in either direction of the first mounting ear 46 or the second mounting ear 50 while permitting the slide 58 to engage shaft 126 in the first position and disengage from shaft 126 in the second position. A retaining pin hole 166 is provided in the first mounting ear 46 to receive the retaining pin 162.

Figure 4:
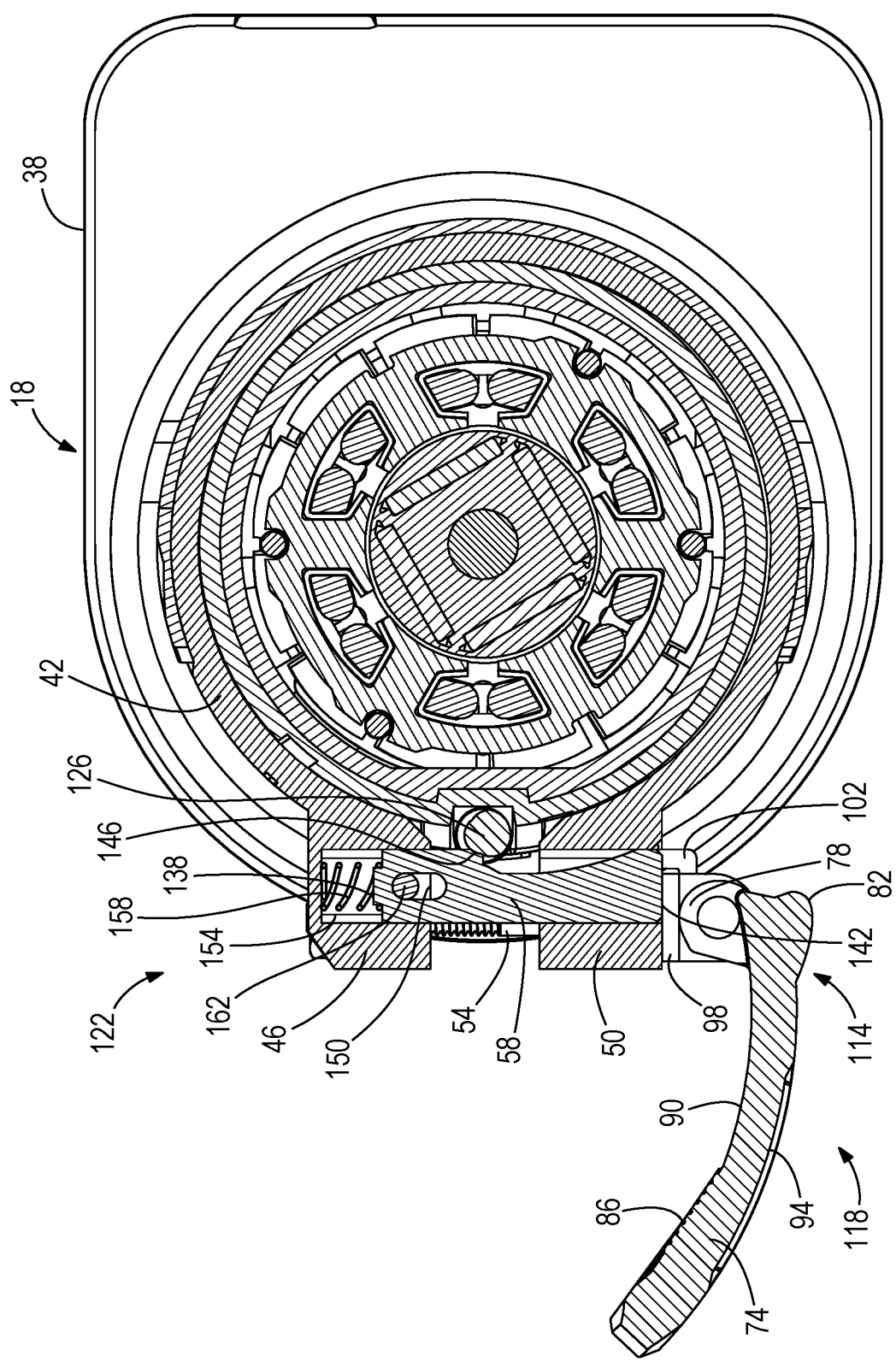
FIG. 4 is a cross-sectional view of the router of FIG. 3, illustrating the lever in a micro-adjustment position.
Figure 5:
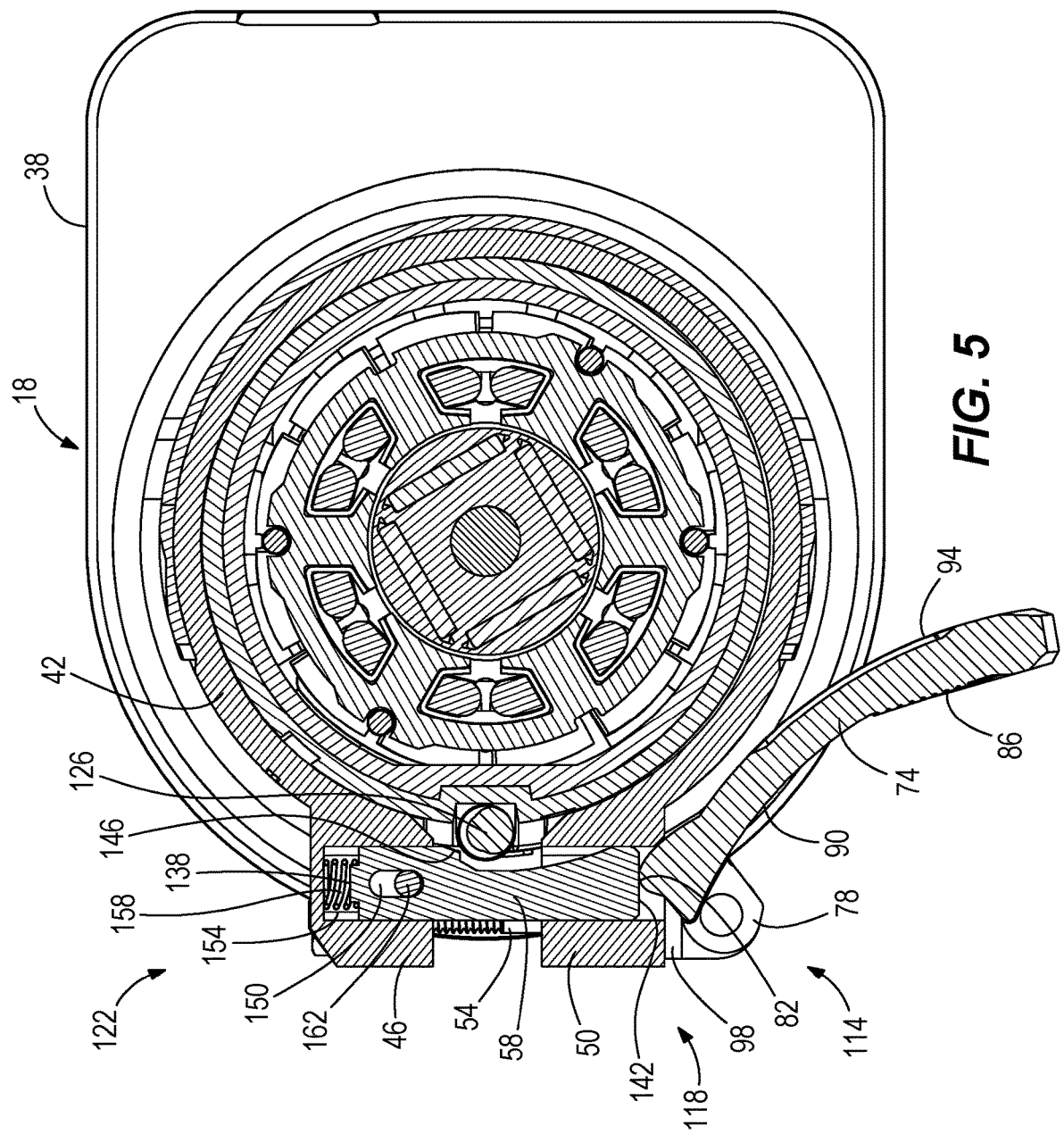
FIG. 5 is a cross-sectional view of the router of FIG. 3, illustrating the lever in an unlocked position.

FIGS. 3, 4, and 5 illustrate the slide 58 in two discrete positions. In FIGS. 3 and 4, the slide 58 is shown in the first position, and in FIG. 5, the slide 58 is shown in the second position. The thread segment 146 on the slide 58 engages the shaft 126 when the slide 58 is in the first position. The thread segment 146 may include one or more threads of essentially any pitch, depth, and angle as long as they correspond with the threads on the shaft 126. The rotation of the micro-adjustment dial 130 rotates the shaft 126, causing the threads of the shaft 126 to rotate. The shaft 126 is translationally fixed. As a result, if the threads of the shaft 126 are in threaded engagement with the thread segment 146, the rotation of the shaft 126 forces the slide 58 to translate parallel to the longitudinal axis A by applying a normal force to the thread segment 146 on the slide 58. Because the slide 58 is fixed to the base 18, the translational movement of the slide 58 relative to the motor unit 14 forces the base 18 to translate relative to the motor unit 14 as well. When the user pivots the lever 74 to the position shown in FIG. 5, the slide 58 is moved from the first position to the second position, and the thread segment 146 is thereby disengaged from the shaft 126. When the user releases the lever 74, the slide 58 returns to the first position because the spring 158 that biases the slide 58 to the first position forces the lever 74 back to the position shown in FIG. 4.

With reference to FIGS. 3, 4, and 5, the lever 74 has at least two functions. As a first function, when the lever 74 is pivoted to the position as shown in FIG. 3, the cam lobe 78 is engaged with the mounting ear 50 (via the plate 98) to provide a clamping force to the base 18, thereby clamping the base 18 to the motor unit 14. As shown in FIG. 4, this clamping force can be relieved, or altogether released, by pivoting the lever 74 in the opposite direction such that the inner side 90 rotates away from the mounting ear 50. As a second function, when the lever 74 is pivoted to the position shown in FIG. 5 where the outer side 94 is adjacent or facing the tubular mounting portion 42, the protrusion 82 is engaged with the lever contact end 142 of the slide 58, compressing the spring 158 and moving the slide 58 from the first position to the second position.

To perform the functions described above, the lever 74 may be adjusted between three discrete positions. First, as shown in FIG. 3, the lever 74 is capable of being in a locked position regardless of the slide 58 being in the first position or the second position. In the illustrated embodiment, the lever 74 is in the locked position when the lever 74 has been fully rotated toward the tubular mounting portion 42 such that the inner side 90 of the lever 74 is adjacent and facing the two mounting ears 46, 50. Second, as shown in FIG. 4, the lever 74 is capable of being in a micro-adjustment position with the slide 58 in the first position. In the illustrated embodiment, the lever 74 is in the micro-adjustment position when the lever 74 is rotated such that the cam lobe 78 is not engaged with the mounting ear 50 and the protrusion 82 is simultaneously not engaged with the lever contact end 142 of the slide 58. Third, as shown in FIG. 5, the lever 74 is capable of being in an unlocked position in which the clamping force exerted on the tubular mounting portion 42 is relieved or altogether released, and the lever 74 disengages the slide 58 from the shaft 126. In the illustrated embodiment, the lever 74 is in the unlocked position when the lever 74 is rotated such that the protrusion 82 engages with the lever contact end 142 of the slide 58, thereby moving the slide 58 from the first position to the second position.

The position of the motor unit 14 relative to the base 18 along the longitudinal axis A, and therefore the cutting depth of the router 10, may be adjusted by the depth adjustment mechanism 122 in two different ways: firstly, by macro-adjustment of the cutting depth and secondly, by micro-adjustment of the cutting depth. As used herein, the term "macro-adjustment" means the coarse adjustment of the position of the motor unit 14 relative to the base 18 along the longitudinal axis A without using the threaded shaft 126 and the slide 58. Rather, coarse adjustment of the cutting depth requires the user of the router 10, with the lever 74 in the unlocked position and the slide 58 in the second position, to slide the motor unit 14 along the longitudinal axis A relative to the base 18 by relatively large axial displacements. The term "micro-adjustment" means the fine adjustment of the position of the motor unit 14 relative to the base 18 along the longitudinal axis by rotating the threaded shaft 126 relative to the engaged slide 58. The pitch of the mated threads on the shaft 126 and the threads of the thread segment 146 defines a relatively small axial displacement of the motor unit 14 relative to the base 18 in response to a single rotation of the shaft 126.

When the slide 58 is in the first position, the engagement between the thread segment 146 and the shaft 126 prevents the user from performing macro-adjustments to the cutting depth but allows the user to perform micro-adjustments to the cutting depth by rotating the micro-adjustment dial 130. When the slide 58 is in the second position, the thread segment 146 is disengaged from the shaft 126, preventing the user from performing micro-adjustments to the cutting depth.

When the lever 74 is in the locked position as shown in FIG. 3, neither macro-adjustments nor micro-adjustments to the cutting depth are permitted, regardless of the slide 58 being in the first position or the second position. When the lever 74 is in the micro-adjustment position as shown in FIG. 4, only micro-adjustments to the cutting depth are permitted with the slide 58 in the first position. When the lever 74 is in the unlocked position as shown in FIG. 5, the protrusion 82 on the lever 74 disengages the slide 58 from the shaft 126 by moving the slide 58 to the second position. Because the cutting depth locking mechanism 118 is unlocked when the lever 74 is in the unlocked position, and because the slide 58 is simultaneously in the second position, only macro-adjustments to the cutting depth are permitted when the lever 74 is in the unlocked position.

Various features of the disclosure are set forth in the following claims.

What is claimed is:

1. A router comprising:
    a motor unit;
    a base that receives the motor unit;
    a threaded shaft supported on one of the motor unit or the base;
    a slide supported on the other of the motor unit and the base, the slide engaging with the shaft in a first position of the slide in which micro-adjustments to a cutting depth are permitted and disengaging with the shaft in a second position of the slide in which macro-adjustments to the cutting depth are permitted; and
    a lever movable between
        a locked position in which neither macro-adjustments nor micro-adjustments are permitted regardless of the slide being in the first position or the second position,
        a micro-adjustment position in which only micro-adjustments are permitted with the slide in the first position, and
        an unlocked position in which the lever disengages the slide from the shaft to permit macro-adjustments.

2. The router of claim 1, wherein the slide is in the second position when the lever is in the unlocked position.

3. The router of claim 1, wherein the lever includes a protrusion that engages the slide to move the slide from the first position to the second position.

4. The router of claim 1, wherein the lever clamps the base to the motor unit when in the locked position.

5. The router of claim 1, further comprising a spring configured to bias the slide toward the first position.

6. The router of claim 1, wherein the base includes two mounting ears spaced from each other, and
    a pin having a first end affixed to a first of the mounting ears and a second end protruding through a second of the mounting ears,
    wherein the lever is pivotably coupled to the second end of the pin, and wherein the lever includes a cam lobe engageable with the second mounting ear to apply a clamping force to the first and second ears, and therefore the motor unit, in response to the lever being adjusted from the micro-adjustment position to the locked position.

7. The router of claim 6, wherein the cam lobe is located on a first side of the lever.

8. The router of claim 7, wherein the lever includes a protrusion extending from an opposite, second side of the lever that is engageable with the slide when the lever is in the unlocked position.

9. The router of claim 8, wherein the cam lobe and the protrusion are integrally formed as a single piece with the lever.

10. The router of claim 8, wherein the slide is oriented parallel to the pin.

11. The router of claim 1, wherein the slide includes at least one thread segment engaged with the threaded shaft when the slide is in the first position, and wherein the thread segment of the slide is spaced from the threaded shaft when the slide is in the second position.

12. A router comprising:
    a motor unit;
    a base that receives the motor unit;
    a threaded shaft rotatably supported on the motor unit;
    a slide supported on the base, the slide engaging with the shaft in a first position of the slide in which micro-adjustments to a cutting depth are permitted in response to rotation of the shaft relative to the base and disengaging with the shaft in a second position of the slide in which macro-adjustments to the cutting depth are permitted in response to an external force from a user to translate the motor unit relative to the base; and
    a lever movable between
        a locked position in which neither macro-adjustments nor micro-adjustments are permitted regardless of the slide being in the first position or the second position,
        a micro-adjustment position in which only micro-adjustments are permitted with the slide in the first position, and
        an unlocked position in which the lever disengages the slide from the shaft to permit macro-adjustments.

13. The router of claim 12, wherein the lever includes a cam lobe engageable with the base to apply a clamping force to the base, and therefore the motor unit, in response to the lever being adjusted from the micro-adjustment position to the locked position.

14. The router of claim 12, further comprising a micro-adjustment dial coupled for co-rotation with the shaft.

15. The router of claim 12, wherein the lever includes a protrusion that is engageable with the slide to move the slide from the first position to the second position.

16. The router of claim 15, further comprising a spring configured to bias the slide toward the first position.

17. The router of claim 16, wherein the slide is movable from the first position to the second position in response to pivoting movement of the lever from the micro-adjustment position to the unlocked position.

18. A method of adjusting a cutting depth of a router, the router including a motor unit and a base that receives the motor unit, the method comprising:
- biasing a slide on one of the base or the motor unit to a first position engaging a threaded shaft on the other of the base and the motor unit, preventing macro-adjustments of the cutting depth;
- moving a lever from a locked position, in which neither macro-adjustments nor micro-adjustments to the cutting depth are permitted regardless of the slide being in the first position or a second position in which the slide is disengaged from the shaft, to a micro-adjustment position in which only micro-adjustments to the cutting depth are permitted with the slide in the first position;
- moving the lever from the micro-adjustment position to an unlocked position; and
- in response to the lever moving into the unlocked position, moving the slide from the first position to the second position, thereby disengaging the slide from the shaft to permit macro-adjustments of the cutting depth.

19. The method of claim 18, wherein moving the lever includes pivoting the lever between the locked position, the micro-adjustment position, and the unlocked position.

20. The method of claim 19, wherein moving the slide from the first position to the second position occurs in response to sliding movement between a protrusion on the lever and the slide.

* * * * *